3,402,175
SALT OF PHENETHYLBARBITURIC ACID
Laszlo Suranyi, Mannheim, Germany, assignor to Knoll A.-G., Ludwigshafen (Rhine), Germany, a corporation of Germany
No Drawing. Original application Apr. 11, 1961, Ser. No. 102,139, now Patent No. 3,210,247, dated Oct. 5, 1965. Divided and this application June 14, 1965, Ser. No. 463,873
1 Claim. (Cl. 260—256.4)

This application is a divisional application of application Ser. No. 102,139, filed Apr. 11, 1961, now U.S. Patent 3,210,247.

The present invention relates to a new and valuable salt of phenylethylbarbituric acid and more particularly to the crystalline addition compound of phenylethylbarbituric acid and cyclohexylisopropyl methylamine, to a process of preparing said compound, and to the use of said compound in the treatment of epilepsy.

Phenylethylbarbituric acid has proved to be a highly effective drug in the treatment of epilepsy. However, in addition to its anti-epileptic effect, it possesses an undesired sedative activity. Frequently, it causes incapacitating drowsiness so that patients who have to take such drugs during the daytime, make a somnolent and indifferent impression. This undesirable sedative effect of phenylethylbarbituric acid is the main factor limiting its usefulness as an anti-epileptic drug.

Attempts have been made to compensate for the sedative effect of phenylethylbarbituric acid by simultaneously administering arousal amines, such as amphetamine or its N-methyl derivative. However, all these attempts were rather unsuccessful, because such arousal amines have too strong a stimulating effect and, thus tend to eliminate the anti-epileptic effect of phenylethylbarbituric acid.

It is one object of the present invention to provide a phenylethylbarbituric acid compound which is substantially free of sedative activity while it still possesses its desired anti-epileptic activity.

Another object of the present invention is to provide a process of preparing such an anti-epileptic phenylethylbarbituric acid compound which is substantially free of sedative activity.

Still another objject of the present invention is to provide a process of treating epilepsy by administration of the new phenylethylbarbituric acid compound.

A further object of the present invention is to provide an anti-epileptic composition which is free of the undesirable sedative activity of phenylethylbarbituric acid.

Other objects of the present invention and advantageous features thereof will become apparent as the description proceeds.

In principle the new phenylethylbarbituric acid compound is obtained by combining phenylethylbarbituric acid with 1-cyclohexyl-2-methylamino propane. The resulting salt-like addition compound is a well-defined crystalline compound which has the anti-epileptic of phenylethylbarbituric acid, but no sedative activity.

Animal tests have shown that the new salt-like compound of phenylethylbarbituric acid and 1-cyclohexyl-2-methylamino propane has a substantially higher anti-epileptic effect than phenylethylbarbituric acid and 1-cyclohexyl-2-methylamino isopropane when administered simultaneously in corresponding doses.

In contrast thereto the salt-like compounds of phenylethylbarbituric acid and amphetamine, or, respectively, its N-methyl derivative, although they have no appreciable sedative effect, have the disadvantage that the anti-epileptic activity of phenylethylbarbituric acid is also eliminated as can be shown in animal experiments. Said compounds have a high analeptic effect as can be seen in laboratory animals by their purposeless and random movements. Thus, the stimulating activity of said compounds rneders them unsuitable for the treatment of epilepsy.

The new compound is prepared, for instance, by reacting phenylethylbarbituric acid with the free 1-cyclohexyl-2-methylamino propane base in the presence or absence of a suitable solvent.

Another method of producing said new compound consists in reacting the alkali metal salt and especially the sodium salt of phenylethylbarbituric acid with a suitable acid addition salt of 1-cyclohexyl-2-methylamino propane, for instance, with its hydrochloride in a suitable solvent.

The new compound has a characteristic melting point and can be recrystallized from suitable organic solvents or from water without decomposition and cleavage to its components. It possesses a considerably increased solubility in water and in this respect differs advantageously from phenylethylbarbituric acid itself.

The following examples serve to illustrate the present invention without, however, limiting the same thereto.

EXAMPLE 1

There are dissolved 29 g. of phenylethylbarbituric acid in 120 cc. of acetic acid ethyl ester while heating and 20 g. of 1-cyclohexyl-2-methylamino propane in the form of the base are added thereto while stirring. The resulting solution is allowed to cool. Thereby, the salt of 1-cyclohexyl-2-methylamino propane and phenylethylbarbituric acid is obtained in the form of fine needles. The yield is almost quantitative. The melting point of the new compound is 130–133° C.

EXAMPLE 2

There are taken 25.4 g. of sodium salt of phenylethylbarbituric acid and 19.1 g. of 1-cyclohexyl-2-methylamino propane hydrochloride and they are boiled under reflux in a mixture of 125 cc. of acetic acid ethyl ester and 125 cc. of ethanol. After boiling for half an hour, the solution is filtered, while still hot, to separate the precipitated sodium chloride. The filtrate is concentrated by evaporation to about half its volume. After cooling 42.5 g. of the salt of 1-cyclohexyl-2-methylamino propane and of phenylethylbarbituric acid are obtained in crystalline form. Its melting point is 130–133° C.

The new compound was compared pharmacologically with the salt-like addition compound of phenylethylbarbituric acid and amphetamine, or, respectively, the N-methyl derivative of amphetamine.

Determination of the toxic doses in mice shows that the new compound has a toxicity which is about 50% lower than that of the other compounds.

The following Table I illustrates the results obtained in determining the dose in mg. per kg. administered orally which causes death in 50% of the mice ($LD_{50}$).

TABLE 1

| Compound: | $LD_{50}$ in mg./k.g |
|---|---|
| Phenylethylbarbituric acid and 1-cyclohexyl-2-methylamino propane | 250.0 |
| Phenylethylbarbituric acid and amphetamine | 171.0 |
| Phenylethylbarbituric acid and N-methyl amphetamine | 172.0 |

Tests carried out to determine the antagonistic activity of the above mentioned three compounds against convulsions caused by the administration of pentylene tetrazol prove that all three compounds are effective with about the same 50% protective dose.

Lethal doses of nicotine, however, are more readily antagonistically effected by administration of the new compound, than by that of the two other compounds, as will become evident from Table II, wherein the 50% protective doses in mg./kg. on oral administration are given.

TABLE II

| Compound | Pentylene Tetrazol [1] | Nicotine [2] |
|---|---|---|
| Phenylethylbarbituric acid and 1-cyclohexyl-2-methylamino propane | 26.5 | 13.0 |
| Phenylethylbarbituric acid and amphetamine | 33.7 | 25.0 |
| Phenylethylbarbituric acid and N-methyl amphetamine | 30.0 | 25.0 |

[1] 50% protective dose against intravenous administration of 14.0 mg./kg. in mice.
[2] 50% protective dose against intravenous administration of 1.0 mg./kg. in mice.

Further tests were carried out with the three compounds whereby mice were subjected to the action of a strong light ray focused on the tip of their trails. At the same time the motility of the animals was determined. The results of these tests are given in the following Table III which indicates the increase in motility in percent over that of control animals, not treated with the drugs.

TABLE III.—DOSE IN MG./KG. ON ORAL ADMINISTRATION

| Compound | 1.0 | 2.0 | 5.0 | 10.0 | 20.0 | 40.0 | 80.0 |
|---|---|---|---|---|---|---|---|
| Phenylethylbarbituric acid and 1-cyclohexyl-2-methylamino propane | | | | | −7.0 | +3.5 | +65.0 | +121.0 |
| Phenylethylbarbituric acid and amphetamine | −20.0 | −10.0 | +136.0 | +129.0 | +158.0 | +128.0 | |
| Phenylethylbarbituric N-methyl amphetamine | +19.0 | +22.0 | +121.0 | +176.0 | +157.0 | +168.0 | |

It is evident that no excitation of the animal is caused when administering the new compound according to the present invention in therapeutic doses. Only when administering high doses, the animals exhibit increased motility. In contrast thereto, the other two compounds show a considerable increase in motility at very low doses which are considerably below the therapeutically effective doses. Said compounds, therefore, cannot be used in the treatment of epilepsy because the resulting stimulation and excitation would render them useless.

These data prove that the new compound has neither the hypnotic effect of phenylethylbarbituric acid nor the stimulating effect of 1-cyclohexyl-2-methylamino propane. The compound according to the present invention, thus, is an ideal anti-epileptic agent because it is free of the disturbing hypnotic effects of phenylethylbarbituric acid and the stimulating effects of 1-cyclohexyl-2-methylamino propane.

Further experiments have shown that the new compound has an increased spasm-inhibiting effect, which is superior to that achieved when administering phenylethylbarbituric acid alone.

The new compound is preferably administered orally in the form of tablets, pills, powders, capsules, solutions, emulsions, suspensions, dispersions, and in any other suitable form.

In the case of powders, fine, uniform dispersions of the new compound within the diluting agent is of importance. Such a fine dispersion can be achieved, for instance, by mixing and milling the new compounds with a solid, pulverulent extending agent to the desired fineness, or by impregnating the already milled, finely powdered, solid carrier with a solution of the active compound in water, or a water miscible solvent and then removing the water or solvent.

As solid carriers, which are suitable for the manufacture of suitable pharmaceutical preparations, various inert pulverulent distributing agents as they are conventionally used in pharmaceutical compounding may be employed.

When preparing tablets, pills, powders, and the like, the commonly used diluting agents, binders, lubricants, and the like are added, such as sugar, lactose, talcum, starch, pectins; as binders, gelatin, gum arabic, methyl cellulose, yeast extract, agar, tragacanth; and as lubricating agents, magnesium stearate, stearic acid, and others.

In human therapy a single dose between 50 mg. and 250 mg. may be given. The preferred single dose is between 100 mg. and 150 mg., administered three times daily. The total daily dose may be between 50 mg. and 800 mg.

The new compound may also be used in the form of suppositories and the like preparations.

Of course, many changes and variations in the method of producing the new compound and of isolating and purifying the same, in the preparation of pharmaceutical compositions containing the same, in its administration to epileptic patients, and the like may be made by those skilled in the art in accordance with the principles set forth herein and in the claim annexed hereto.

For instance, tablets may be prepared as follows:

The salt of the phenylethylbarbituric acid and 1-cyclohexyl-2-methylamino propane is mixed with dried corn starch, talc and a paste containing potato starch in 6% aqueous solution, then granulated and dried. Granulated corn starch and talc are added to the granules which are then mixed thoroughly and pressed to tablets containing per unit dose 100.0 mg. of the salt, 80.9 mg. of corn starch, 14.0 mg. of talc and 5.1 mg. of potato starch.

There could be noticed that the new compound possesses an activity of a different kind than that of the equimolecular mixture of corresponding quantities of the sodium salt of phenylethylbarbituric acid and 1-cyclohexyl-2-methylamino propane hydrochloride. Equal doses of the new compound and the above said mixture have been tested in the electroshock tests in rats comparing their protective action against electrically caused convulsions and the obtained curves showing the degree of action in dependence of the administered doses according to Litchfield and Wilcoxon have been mathematically evaluated. Hereby it resulted a dissimilar rising angle of the curves of action in dependence of the administered doses which point to the fact that in the new compound the peroral resorption passes more favorable than in the mixture.

The new compound reacts more favorable than the sodium salt of phenylethylbarbituric acid with regard to the solubility and the stability of aqueous solutions. One g. of the new compound dissolves at 20° C. in 100 ml. of water while phenylethylbarbituric acid in the same volume of water is only soluble up to 0.097 g. The 0.5% solution in water shows a pH of only 8.0 to 8.5 in comparison with a pH of 9.0 to 9.5 of the sodium salt of phenylethylbarbituric acid. The stability of aqueous solutions against acidifying and alkalizing agents, as they are present in the gastro-intestinal tract, is clearly better than in the sodium salt of phenylethylbarbituric acid.

I claim:

1. The addition compound of 5-ethyl-5-phenylbarbituric acid and 1-cyclohexylisopropyl-2-methylamine.

References Cited

UNITED STATES PATENTS

| | | | |
|---|---|---|---|
| 2,678,313 | 5/1954 | Schnider | 260—258 |
| 3,014,966 | 12/1961 | Freifelder et al. | 260—563 |
| 3,210,247 | 10/1965 | Suranyi | 167—65 |

NICHOLAS S. RIZZO, Primary Examiner.

R. J. GALLAGHER, Assistant Examiner.